June 25, 1957          H. C. CARLSON          2,797,148
RECOVERY OF $NH_3$ FROM A GASEOUS MIXTURE CONTAINING $NH_3$ AND HCN
Filed March 13, 1951
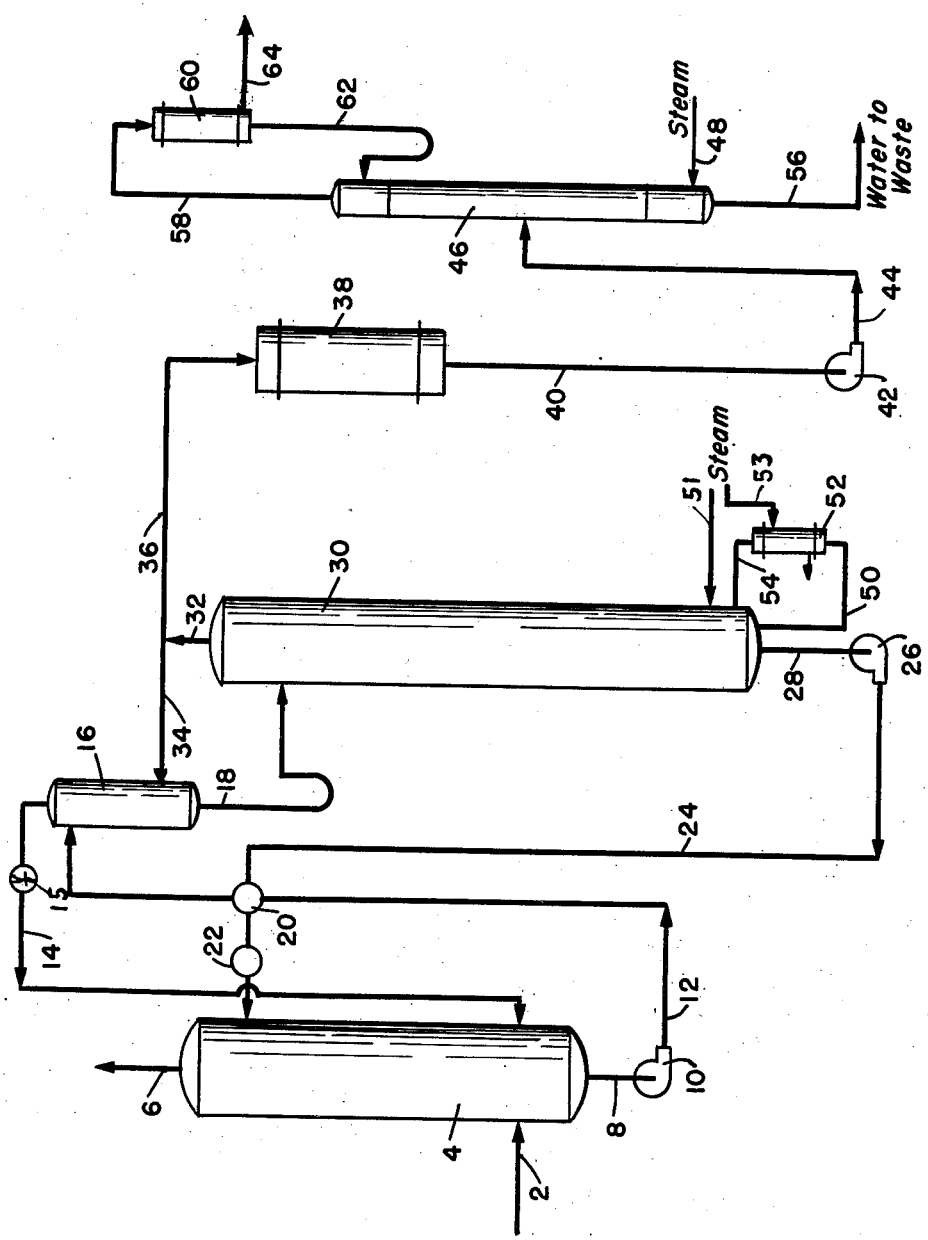
Harrison C. Carlson
INVENTOR.
BY
ATTORNEY.

United States Patent Office 2,797,148
Patented June 25, 1957

2,797,148

RECOVERY OF NH₃ FROM A GASEOUS MIXTURE CONTAINING NH₃ AND HCN

Harrison C. Carlson, Wilmington, Del., assignor to E. I. du Pont de Nemours and Company, Wilmington, Del., a corporation of Delaware Application March 13, 1951, Serial No. 215,323

5 Claims. (Cl. 23—196)

This invention relates to the recovery of ammonia from gases containing ammonia and hydrocyanic acid. More particularly, this invention relates to an important improvement in the recovery of ammonia from gases containing ammonia and hydrocyanic acid by the recirculation of an aqueous solution of an ammonium hydrogen phosphate.

The copending patent application of Howard D. Green, Serial No. 161,477, filed May 11, 1950, now forfeited, discloses a process for recovering ammonia from the reaction off-gases obtained from the synthesis of HCN, which process comprises absorbing the ammonia in a solution of an ammonium hydrogen phosphate, heating the resulting ammonium phosphate solution to drive off ammonia therefrom, and returning the residual phosphate solution to the ammonia absorption step.

The HCN in the HCN—NH₃-containing gas is not decomposed or polymerized in the ammonia absorption step even though the phosphate solution is alkaline after completion of this step. Moreover, no difficulty has been experienced during the stripping of the ammonia from the phosphate solution by heating. However, in concentrating ammonia after its removal from the phosphate solution it was found that residual quantities of HCN in the ammonia polymerized to such an extent in the concentrating apparatus as to cause plugging thereof.

It is therefore an object of this invention to provide an improved process for the recovery of ammonia from HCN—NH₃-containing gases.

It is another object of this invention to provide a process for recovering ammonia from HCN—NH₃-containing gases, including the absorbing of ammonia in, and stripping the same from, an aqueous ammonium hydrogen phosphate solution, the recovered ammonia being substantially free from residual HCN.

Other objects of this invention will appear hereinafter.

By "substantially free from residual HCN" is meant sufficiently free therefrom that concentration of the ammonia will not involve objectionable accumulation of HCN polymer.

The objects of this invention may be accomplished, in general, by passing steam through the ammonium hydrogen phosphate solution flowing from the ammonia absorption step to the ammonia stripping step in a process for the recovery of ammonia from gas containing ammonia and hydrocyanic acid by alternate absorption in and stripping of ammonia from an aqueous solution of an ammonium hydrogen phosphate.

The accompanying diagrammatic drawing illustrates a preferred embodiment of apparatus suitable to carry out the process of this invention.

Referring to the drawing, reference numeral 2 designates a feed line for a gaseous mixture containing NH₃ and HCN. This gas passes into an aqueous ammonium hydrogen phosphate solution in absorption tower 4 and from the tower through outlet line 6. The phosphate liquid, enriched with NH₃ passes from the tower through line 8 and is pumped to an HCN stripper 16 by means of pump 10 and pipe line 12. If desired, the phosphate liquid may be warmed by passing the same through heat exchanger 20.

From stripper 16 the liquid is passed to ammonia stripper 30 through line 18. Steam is preferably used to heat the ammonia stripper 30 to remove the ammonia from the phosphate solution. This steam may be passed directly into the solution in 30 through line 51, or it may be passed into a steam boiler 52 through line 53. Phosphate solution may be circulated through the boiler through lines 50 and 54. The heat strips the ammonia from 30 and causes a mixture of ammonia and water vapor to pass from 30 through line 32. As illustrated, line 32 splits into lines 34 and 36. Line 34 serves to pass the mixture of ammonia and water vapor at an elevated temperature, e. g., 75° C. or higher, from line 32 to HCN stripper 16. The passage of ammonia and water vapor through the phosphate solution in 16 strips most of the HCN from this solution and line 14 serves to pass this gas containing water vapor, ammonia and HCN back to absorber 4. The quantity of water vapor and ammonia passing through lines 32, 34 and 14 is regulated by throttle valve 15 and will depend upon the quantity of HCN it is necessary or desirable to remove.

The stripped phosphate solution is recirculated from stripper 30 to absorber 4 by means of pump 26 and lines 24 and 28. If desired, this phosphate solution may be cooled by passing through heat exchanger 20 and cooler 22.

The water vapor and ammonia that passes from line 32 to line 36 is condensed in condenser 38 and is then passed through lines 40 and 44 and pump 42 into ammonia concentrator or enricher 46. Steam is passed into enricher 46 through line 48 whereby to drive off ammonia and some water vapor which passes from 46 through line 58 into condenser 60. A portion of the condensate is refluxed to the enricher 46 through line 62 and the ammonia gas having a concentration of 50% up to approaching 100% is removed through line 64. The water that accumulates in the enricher 46 is removed to waste through line 56.

The absorber 4, strippers 16 and 30, and enricher 46 may be bubble-cap towers, packed towers or other known equipment conventionally used for the absorption in, or stripping of gases from, a solution. Preferably, 4, 16 and 30 are bubble-cap towers and 46 is a packed column.

The process of removing and concentrating ammonia from a gas containing ammonia and hydrocyanic acid by the use of the apparatus illustrated may be carried out as follows.

A reaction off-gas from the process of preparing HCN by reacting ammonia with a hydrocarbon-bearing gas and an oxygen-containing gas, and containing ammonia, hydrocyanic acid, hydrogen, nitrogen, water vapor and carbon oxides is first cooled to a temperature of 55° to 90° C. and is led into absorption tower 4 through line 2. The gases pass upwardly and counter-currently to a downcoming stream of an ammonium hydrogen phosphate aqueous solution composed of a mixture of ammonium dihydrogen phosphate $(NH_4H_2PO_4)$ and diammonium hydrogen phosphate $(NH_4)_2HPO_4$, for example one corresponding to the formula $(NH_4)_{1.3}H_{1.7}PO_4$ of about 35% by weight in water. The solution absorbs ammonia so that the liquid leaving the bottom of the tower is an ammonium phosphate solution having a larger proportion of the diammonium salt, for example, one corresponding to the formula $(NH_4)_{1.84}H_{1.16}PO_4$. The hydrocyanic acid-containing gases leaving the top of the absorption tower 4 through line 6 are substantially free from ammonia and may be recovered as liquid or gaseous HCN.

The liquid phosphate solution, by reason of its lower concentration of NH₃, will be slightly acidic, for example, it will have a pH of about 6, whereas the liquid leaving the bottom of the tower 4 through line 8 will be alkaline, pH of about 8.

The ammonia-rich phosphate solution is passed from tower 8 to stripper 16 where steam at a temperature of 90° C. to 125° C. (depending upon operating pressure) is passed counter-currently to the solution in order to remove residual amounts of HCN from the solution. This stream may consist of saturated steam passed into the bottom of stripper 16 from any independent source. Preferably, however, this steam consists of the mixture of steam and ammonia that is stripped from the phosphate solution in stripper 30. The $NH_3$ content of this gas is in substantial equilibrium with the $NH_3$ content of the phosphate solution in 30 and therefore will prevent removal of unduly large amounts of $NH_3$ from the solution in stripper 16.

Most conveniently, a minor proportion of the steam and ammonia from 30 is passed through 16 to remove the HCN. The proportion that is passed through 16 by line 34 will be determined by the amount of HCN to be removed from the phosphate solution in 16. Generally, it will be preferred to remove that amount of HCN which will avoid objectionable accumulation of HCN polymer in following apparatus. The quantity of steam and ammonia passed to 16 will be regulated by throttle valve 15 after the desired amount has been determined, for example, by analysis.

The phosphate solution containing an insignificant amount of HCN is now passed from 16 into 30 where the larger part of the absorbed ammonia is stripped therefrom. This stripping is accomplished by heating the solution in 30, for example, by passing saturated steam into direct contact with the phosphate solution in 30 or indirectly heating the phosphate solution by means of steam as illustrated. The temperature in 30 will, of course, be the boiling point of the solution at the prevailing pressure.

The ammonia-poor phosphate solution is removed from the bottom of 30 and returned to the top of absorber 4 after cooling to 55° C. to 90° C.

The water vapor and ammonia passing from 30 to lines 32 and 36 are condensed in water condenser 38 and this liquid is passed into ammonia concentrator or enricher 46.

Steam is passed into the enricher thus driving the ammonia therefrom together with water vapor. This ammonia and water vapor is condensed in condenser 60 and the liquid refluxed to 46 and the ammonia vapor removed through line 64. The water, substantially free from ammonia, is withdrawn to waste from enricher 46. The ammonia gas passing through line 64 may be used to produce additional amounts of HCN by reaction with an oxygen- and hydrocarbon-bearing gas.

Preferably, the above-described process and apparatus is operated in a continuous fashion in all its phases. The absorption tower and the strippers and enricher may be operated at atmospheric pressure or pressures up to 2 to 4 atmospheres. The several parts may obviously be operated at the same or different pressures.

In order to satisfactorily separate ammonia and hydrocyanic acid, the concentration of the phosphate in the recirculating absorption solution is maintained within the range of 25% to 35% by weight of phosphate radical ($PO_4$). The upper limit of phosphate in the solution is the concentration at which crystallization of the phosphate takes place. The composition of the phosphate solution entering tower 4 should be within the range as expressed by the formula $(NH_4)_n H_{3-n} PO_4$, where $n$ is a number from 1.2 to 2.0.

The process may be started by initially feeding into tower 4 a phosphoric acid solution, or an ammonium hydrogen phosphate solution. Mechanical losses of the phosphate solution may be replenished by adding phosphoric acid or an ammonium salt thereof. The composition of the circulating liquids is dependent on the temperature in the absorption tower 4 and on the partial pressure of the ammonia in the gases fed into the absorption tower.

By operating in accordance with this invention to pass steam through the phosphate liquid passing from the ammonia absorption step to the ammonia stripping step it is possible to obtain an ammonia-rich phosphate liquid substantially free from HCN. This invention therefore makes it possible to absorb ammonia in a phosphate solution, strip the ammonia from such solution and concentrate the ammonia without objectionable accumulation of HCN polymer in the ammonia concentrating apparatus.

Reference in the specification and claims to parts, proportions and percentages, unless otherwise specified refers to parts, proportions and percentages by weight.

Since it is obvious that many changes and modifications can be made in the above-described details without departing from the nature and spirit of the invention, it is to be understood that the invention is not to be limited to said details except as set forth in the appended claims.

I claim:

1. The process of recovering ammonia from a mixture of gases containing ammonia and HCN which comprises passing said mixture through an aqueous absorbing solution of ammonium hydrogen phosphate, whereby substantially all of the ammonia and a minor portion of the HCN are absorbed in said solution and a major portion of the HCN passes unabsorbed from said solution, subsequently passing through the solution resulting from the above step such an amount of steam as to remove absorbed HCN but only a minor proportion of the absorbed ammonia therefrom, subjecting the resulting solution to heating to strip remaining available ammonia therefrom, and collecting the ammonia stripped from said solution in said last step.

2. The process of recovering ammonia from a mixture of gases containing ammonia and HCN which comprises passing such mixture of gases through an aqueous absorbing solution of ammonium hydrogen phosphate whereby substantially all of the ammonia and a minor portion of the HCN are absorbed in said solution and a major portion of the HCN passes unabsorbed from said solution, passing the resulting solution into an HCN removal zone, passing such an amount of steam through the solution in said HCN removal zone as will remove absorbed HCN but only a minor proportion of the absorbed ammonia therefrom, passing the substantially HCN-free solution into a stripping zone, heating the solution in the stripping zone to remove remaining available ammonia together with water vapor therefrom, and collecting the ammonia and water vapor removed in said stripping zone.

3. The process of recovering ammonia from a mixture of gases containing ammonia and HCN which comprises passing such mixture of gases through an aqueous absorbing solution of ammonium hydrogen phosphate whereby substantially all of the ammonia and a minor portion of the HCN are absorbed in said solution and a major portion of the HCN passes unabsorbed from said solution, passing the resulting solution into an HCN removal zone, passing such an amount of water vapor and ammonia having a temperature of at least 75° C. through the solution in said HCN removal zone as will remove absorbed HCN but only a minor proportion of the absorbed ammonia therefrom, passing the substantially HCN-free solution into a stripping zone, heating the solution in the stripping zone to remove remaining available ammonia together with water vapor therefrom, and collecting the ammonia and water vapor removed in said stripping zone.

4. The process of recovering ammonia from a mixture of gases containing ammonia and HCN which comprises passing such mixture of gases through an aqueous absorbing solution of ammonium hydrogen phosphate whereby substantially all of the ammonia and a minor portion of the HCN are absorbed in said solution and a major portion of the HCN passes unabsorbed from said solution, passing the resulting solution into an HCN removal zone, passing such an amount of water vapor and ammonia having a temperature of at least 75° C. through the solution in said HCN removal zone as will remove absorbed HCN but only a minor proportion of the absorbed ammonia therefrom, passing the substantially HCN-free solution into a stripping zone, heating the solution in the stripping zone to remove remaining available ammonia together with water vapor therefrom, and collecting the ammonia and water vapor removed in said stripping zone, the ammonia and water vapor passed into said HCN removal zone being a portion of the ammonia and water vapor collected from said stripping zone.

5. The process of recovering ammonia from a mixture of gases containing ammonia and HCN which comprises passing such mixture of gases through an aqueous absorbing solution of ammonium hydrogen phosphate whereby substantially all of the ammonia and a minor portion of the HCN are absorbed in said solution and a major portion of the HCN passes unabsorbed from said solution, passing the resulting solution into an HCN removal zone, passing such an amount of water vapor and ammonia having a temperature of at least 75° C. through the solution in said HCN removal zone as will remove absorbed HCN but only a minor proportion of the absorbed ammonia therefrom, returning the gases containing the removed HCN together with some ammonia and water vapor to the aqueous absorbing solution of ammonium hydrogen phosphate into which the ammonia-HCN gas mixture is being passed whereby to recover ammonia therefrom, passing the substantially HCN-free solution into a stripping zone, heating the solution in the stripping zone to remove remaining available ammonia together with water vapor therefrom, and collecting the ammonia and water vapor removed in said stripping zone, the ammonia and water vapor passed into said HCN removal zone being a portion of the ammonia and water vapor collected from said stripping zone.

References Cited in the file of this patent

UNITED STATES PATENTS

| | | |
|---|---|---|
| 2,419,225 | Mitchell et al. | Apr. 22, 1947 |
| 2,496,999 | Houpt et al. | Feb. 7, 1950 |

FOREIGN PATENTS

| | | |
|---|---|---|
| 857,242 | France | July 4, 1939 |
| 222,587 | Great Britain | Oct. 7, 1924 |

OTHER REFERENCES

"Gas Engineers Handbook," 1934 ed., pages 506, 507; McGraw-Hill Book Co., Inc., N. Y.